Figure 2:
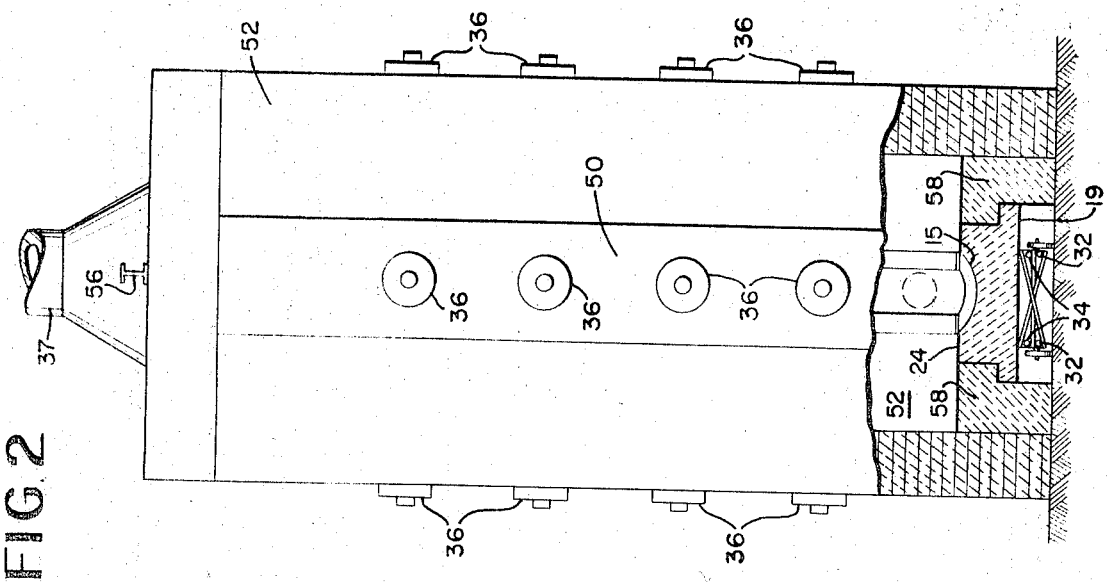

United States Patent

[11] 3,550,919

| [72] | Inventor | Hal B. H. Cooper |
| | | 4234 Chevy Chase Drive, Pasadena, Calif. 91103 |
| [21] | Appl. No. | 775,260 |
| [22] | Filed | Nov. 13, 1968 |
| [45] | Patented | Dec. 29, 1970 |

[54] FURNACE STRUCTURE
12 Claims, 2 Drawing Figs.

[52] U.S. Cl. .................................................... 263/20, 263/42
[51] Int. Cl. .................................................... F23l 15/04
[50] Field of Search ............................................. 263/20, 42; 165/104

[56] References Cited
UNITED STATES PATENTS

| 2,507,662 | 5/1950 | Cripps | 263/20 |
| 2,530,958 | 11/1950 | Greene | 263/20 |
| 2,690,051 | 9/1954 | Peskin | 165/104X |
| 3,020,032 | 2/1962 | Casey | 263/42 |
| 3,387,836 | 6/1968 | Stookey | 263/20 |

Primary Examiner—John J. Camby
Attorney—Eric P. Schellin

ABSTRACT: A furnace particularly suitable for the heating of corrosive gas streams which furnace comprises a fused quartz tube conduit structure having one or more vertically disposed segments with the individual segments being carried in compression by underlying supporting means.

INVENTOR.
HAL B. H. COOPER

FURNACE STRUCTURE

BACKGROUND OF THE INVENTION

1. Field of the Invention

This invention relates to the improved furnace structure for the heating or corrosive materials to elevated temperatures.

The heating of corrosive materials such as the halogens and volatile inorganic halides in metal is generally limited to temperatures not exceeding 500° C. because of corrosive attack to the heat transfer tubes and contamination of the material being heated. For processes which require heating above this temperature level, fused quartz, or fused silica, as it is more commonly known, is normally used. It has very desirable corrosion resistant properties, but, as a material of construction, has certain limitations.

Fused quartz is available as an amorphous or non crystalline glass noncrystalline glass which can be fabricated in various shapes, including tubes. It may be had in either translucent (sometimes described as opaque) or transparent (relatively clear) forms. Both varieties have a high silicon dioxide content, typically in excess of 99.8 percent. The translucent variety usually contains a somewhat higher impurity content and frequently contains a large amount of tiny bubbles within its body and one or both of its surfaces may be roughened from the shaping or finishing operation, e.g. sand, satin or glazed finish. The clear variety (transparent form) of fused quartz, generally, is essentially clear of bubbles and both surfaces are smooth.

Conventionally, fused quartz tube furnaces have utilized the translucent variety of quartz even though the transparent variety has significantly greater strength, the latter being of the order of five times stronger. In heating materials of low radiation absorptivity, such as titanium tetrachloride, silicon tetrachloride and the like, conventional fused quartz tube furnaces have used the translucent variety despite its lower strength because of this problem. The foregoing type of molecules, as well as boron trichloride, chlorine and oxygen, are symmetrical in structure and have a low radiation absorptivity. Thermal radiation largely passes through a stream of such symmetrical gas molecules and is not absorbed and converted to sensible heat. The prior art quartz tube structures have transferred heat to such symmetrical molecule gas streams mainly by conduction and forced convection from the inside surface of the quartz tube heating duct. Translucent quartz is far superior in absorbing thermal radiation to the transparent variety—the latter is in fact an excellent transmitter of radiation over a fairly wide spectrum, e.g., a wave length of 0.2 to 3.0 microns. While the translucent variety absorbs substantially more of the thermal radiation falling on and passing into it, it is not fully efficient and a significant amount of the radiation is generally not absorbed and utilized in heating the fluid stream. When using the translucent variety, the low thermal conductivity of quartz and the problem of possible devitrification has required the use of relatively low temperature differentials and, therefore, large heat transfer areas. There have thus been many problems of design and operation, which lead to very high furnace investment and maintenance costs. The low rate of heat transfer obtainable and low temperature differential allowable make necessary sizeable heat transfer areas and large furnaces where translucent quartz tubes are utilized, particularly where contrasted with more conventional heating systems employing metal heat transfer tubes.

The applicant of the present invention has devised several fused quartz tube structures (such as described in U S. Pat. application Ser. No. 749,005, filed July 31, 1968, now abandoned) which permit the use of conduits of the much stronger transparent variety quartz rather than the translucent quartz now more commonly employed. The improved furnace structures of the applicant utilize an outer substantially radiation-transparent fused quartz tube which contains therein a plurality of radiation-absorbing surfaces, provided by structure open to the flow of the gas stream being heated. In a preferred embodiment the radiation-transparent tube provides the outer wall of an annular heating zone which zone contains a plurality of radiation absorbing packings such as Raschig rings, Berly saddles, and the like. The applicant's structure in one preferred form uses a transparent quartz tube conduit structure of approximately one-tenth the length of that required for the more conventional translucent quartz heating duct to heat the same amount of corrosive fluid to a like temperature. Further, the increased strength of the transparent variety of quartz brings about a significant reduction in the maintenance costs of a transparent quartz variety installation as contrasted with a that of a translucent quartz installation. The advantages derived from the improved transparent quartz structure as described in Ser. No. 749,005 may be translated to more fluid being heated per length of heating structure for the same duty. This advantage permits the erection of smaller and lower cost furnaces and leads to significantly reduced maintenance costs. The transfer of radiant energy directly into the heating zone and the avoidance of having to transfer such heat through the outer silica wall by conduction as required by the prior art translucent structure, permits lower temperatures of the outer silica wall, reducing devitrification problems and thereby greatly extending the life of the silica tubing. While some of the heat supplied to the fluid being heated will be transferred through the quartz by conduction, this will be relatively small in amount to that transferred directly inside the tube by radiation.

It has been the practice in the prior art translucent quartz furnace structures and the applicant's improved transparent quartz furnace structure to carry the quartz tube conduit by water cooled hangers or the like. The tubes are positioned either horizontally or vertically. Such methods of support place the quartz in tension and produce unbalanced stresses on the quartz tube.

2. Summary of the Invention

Fused quartz, both of the transparent and translucent varieties, is many times stronger in compression than in tension, and as is shown in the following comparisons, transparent fused quartz has significantly greater strength, both in tension and compression, than the translucent type. Some typical data in this connection is set forth below. The data are taken from a brochure on Fused Silica of the Thermal American Fused Quartz Co.

ULTIMATE COMPRESSIVE STRENGTH

Transparent Rods (0.75″ diam.)___lbs./sq. in__ 163,500
Translucent Rods (0.75″ diam.)___lbs./sq. in__ 39,000
Translucent Tubes and Pipes (8″ bore x 0.5″ walls)_____lbs./sq. in__ 22,000

TENSILE STRENGTH

Transparent Rods (0.5″ diam.)____lbs./sq. in__ 4,000
Translucent Rods (0.5″ diam.)____lbs./sq. in__ 400
(min.)

BURSTING STRESS (ULTIMATE)

Transparent Tubes (0.4″ bore, ext. diam. 0.72″)
lbs./sq. in__ 6,500
Translucent Tubes (0.4″ bore, ext. diam. 0.72″)
lbs./sq. in__ 2,012

The furnace structure of the invention takes advantage of the significantly higher compressive strength of fused quartz that is found in either a transparent quartz or a translucent quartz tube furnace structure. The advantage to be had in the practice of the invention is considerably greater for a transparent tube structure, than a translucent tube structure, but is nevertheless a major improvement for furnaces employing translucent quartz.

The improved furnace structure of the invention comprises a fused quartz tube conduit structure having one or more vertically disposed segments with substantially all of the weight of the individual segments being carried in compression. Means is provided for supporting the quartz tube structure by underlying surfaces engaging the lower ends of the vertically disposed segments. The supporting means, through its underlying surfaces, carry in compression substantially all of the weight of the conduit structure.

Preferably, the length of the quartz tube conduit structure is principally in its vertically disposed segments. In one embodiment of the structure of the invention, the supporting means comprises a movable cart upon which the conduit structure is mounted with the movable cart being arranged for movement into and out of the furnace proper. The underlying surfaces engaging the lower ends of the vertically disposed conduit segments comprise a compatible refractory material which may be, for example, either a foamed quartz or a solid refractory.

Figure 1:
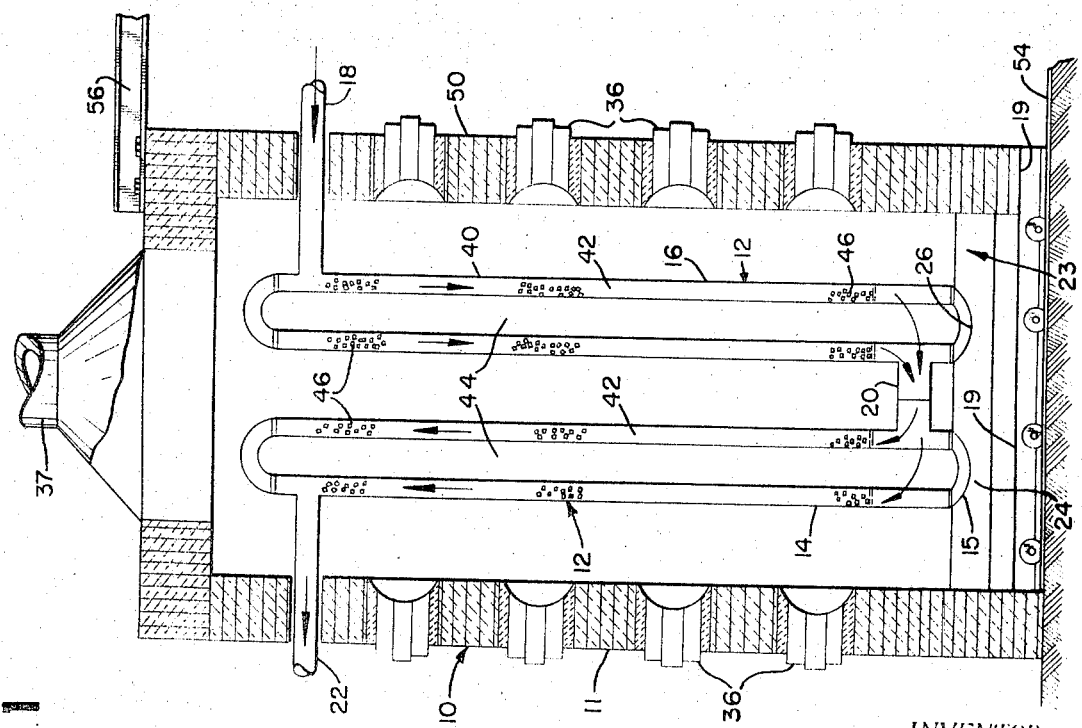

Other objects and advantages of the structure will become more apparent from the following description and drawings, wherein:

FIG. 1 is a schematic longitudinal sectional view of a preferred embodiment of the furnace of the invention; and FIG. 2 is an end elevational view of the furnace of FIG. 1, partially cut away, to better illustrate the embodiment utilizing a moveable cart to support the quartz tube conduit gas carrying structure.

The furnace 10 illustrated in FIGS. 1 and 2 is particularly adapted for the heating of corrosive materials such as titanium tetrachloride and the like. The furnace 10 comprises an outer refractory shell 11 of conventionally used materials which houses a fused quartz tube conduit structure 12 which, in the particular embodiment illustrated, has two vertically disposed segments 14 and 16. The corrosive gas being heated enters the furnace through a decoupleable, fused-quartz, horizontally extending conduit 18, which opens into the upper portion of a vertical segment 16. The corrosive gas flows downwardly through the segment 16, transversely in a horizontal direction through a fused quartz tube connecting conduit 20 into the base of the second vertically disposed segment 14 through which the gas flows upwardly, leaving the furnace in a horizontally disposed fused-quartz tube outlet conduit 22. Conduit 22 transfers the heated corrosive gas out of the furnace to further processing.

In the furnace of the invention, means 23 is provided for supporting the quartz tube structure 12 which means, in the particular embodiment illustrated, comprises a movable cart 24 which is adapted for movement into and out of the furnace proper with the quartz tube structure 12 supported thereon. The supporting means for the quartz tube structure 12 includes an underlying surface which engages and carries the lower ends of the vertically disposed segments 14 and 16. The supporting means 23 carries substantially all the weight of the quartz conduit structure 12 in compression. Desirably, the vertically disposed segments 14 and 16 are formed with rounded lower ends 26 which rest in complementary depressions or recesses formed in the upper surface of the supporting means 23 of a movable cart 24. The upper portion of the movable cart 14 in contact with the quartz tube conduit structure 12 is formed of a compatible refractory material 15, for example, foamed quartz or a solid refractory which may be individual bricks or, alternatively, a cast structure. The foamed quartz, if used, in turn could rest upon higher-strength alumina or other refractory bricks which are supported in a steel framework 19 of the movable cart 24. The steel framework 19 of the cart 24 is water cooled with the cooling water being supplied through decoupleable inlet and outlet lines 32 and 34.

In some embodiments it will be found advantageous to provide a silica cloth cushioning layer in each of the complementary recesses of the supporting means beneath the rounded ends of the vertically disposed segments 14 and 16 of the quartz tube conduit structure 12.

It will be understood that the supporting means 23 may be a fixed structure within the furnace 10 but, of course, with a fixed arrangement, maintenance and assembly work must be carried on in a relatively confined area. In still another arrangement of a fixed conduit structure, the furnace shell may be formed of two movable halves which can be moved away from each other to provide ready access to the fixed conduit structure.

The furnace of the invention may be provided with gas burners 36 whose exhaust gases empty into the interior of the furnace 10 and provide radiant energy for the heating of the gas streams passing through the quartz tube structure 12. The exhaust gases leave the furnace via stack 37. Alternatively, as known in the art, the furnace may be heated by electrical heaters located on the sidewalls of the furnace adjacent to the quartz tube conduit 12, or directly around the two vertically disposed segments 14 and 16.

The advantages of supporting the fused quartz tube conduit structure in compression may be had with a conduit structure of either transparent or translucent fused quartz tubes. Either type of fused quartz has significantly higher strength in compression in contrast to tensile strength. The advantages to be had from the practice of the invention is significantly greater in a transparent tube conduit structure and such structure is illustrated in the drawings of the invention.

In the embodiment of FIGS. 1 and 2, the conduit structure utilizes an outer, radiation-transparent fused quartz tube 40 which serves as the outer wall of an annular heating zone 42, the other wall of which is defined by a closed tubular member 44. The inner tubular member 44 may, as illustrated in FIGS. 1 and 2, be formed of radiation-transparent quartz or, alternatively, of a radiation-absorbing quartz. The tubular member 44 in being closed at its opposite ends assures that the gas flows through the annular heating zone 42. In the particular form of the structure of the invention illustrated, a plurality of radiation-absorbing surfaces within the annular heating zone 42 is provided by radiation-absorbing packings 46 which may take the form of Raschig rings, Berl saddles, and other known packing forms. In this particular embodiment little or substantially no radiation will reach the inner cylindrical tubular member 44.

The open packing 46 may be formed of the material such as silica, alumina, zirconia, carbon, silicon carbide, alumina-silicate, clay, ceramics, refractory metal oxides, carbides, aluminates and silicates. The plurality of radiation-absorbing members within the annular heating zone 42 may take other forms as illustrated in applicant's application Ser. No. 749,005 filed July 31, 1968, such as longitudinally extending rods, disposed within the annular heating zone 42 and formed of radiation-absorbing material enumerated above. Ser. No. 749,005 is incorporated herein by reference.

Thermal radiation passes through the outer transparent fused quartz tube 40 of the two vertically disposed segments 14 and 16, and is absorbed in striking the plurality of radiation-absorbing surfaces positioned within the annular heating zone 42, and, accordingly, raises the temperature of the surfaces from which the heat is then transmitted by conduction and convection into the flowing gas. In employing a plurality of radiation-absorbing members, whether it be longitudinally extending rods, or packings, reflected energy will be likely absorbed by adjacent members. The several proposed radiation-absorbing members are open in structure so as to minimize obstruction to flowing gas being heated in the annular heating zone 42 and to provide a large amount of heat exchange area. The employment of an annular heating zone 42 avoids the present of a core of unheated gas shielded from radiation by the outwardly-lying radiation-absorbing structures. The annular heating zone 42 thus assures that substantially all the gas flowing therethrough is exposed to heated radiation-absorbing structures. The annular heating zone 42 thus assures that substantially all the gas flowing therethrough is exposed to heated radiation-absorbing structures. The annular heating zone 42 is sized to assure that all or nearly all of the radiation-absorbing surfaces will receive direct or reflected radiation.

In the embodiment best seen in FIG. 2, a vertical central movable wall section 50 of end wall 52 is carried on one end of the movable cart 24 by the steel framework 19. When it is desired to remove the fused quartz conduit structure 12 from the furnace 10, the horizontally extending conduit segments 18 and 22 are decoupled and the movable cart is pulled along rails 54. It is also necessary, of course, to disconnect the inlet and outlet water cooling pipes 32 and 34 of the cart 24. With movement of the cart 24 the vertical wall 50 moves out of the end wall 52. During movement of the cart 24 and its load, the wall section 50 and the conduit structure 12 may be stabilized by supports suspended from overhead rail 56.

As seen in FIG. 2, refractories 58 are disposed on either side of the positioned cart 24 within the furnace. The refractories 58 which extend the inside depth of furnace loosely engage the sides of the cart and do not interfere with the removal of the cart 24 from the furnace.

It will be apparent to those skilled in the art that variations are possible to the foregoing described structure and method.

I claim:

1. In a furnace for the heating of a gas stream, the improvement comprising:

A fused quartz tube conduit structure having one or more vertically disposed segments, said tube providing the outer wall of an annular heating zone open at its opposite ends to the flow of the gas stream being heated and conduit means for delivering to and removing from the annular heating zone the gas stream being heated; and means for supporting the lower ends of the vertically disposed segments, said supporting means having underlying carrying substantially all of the weight of the segments.

2. A furnace in accordance with claim 1 wherein the length of the tube conduit is principally in its vertically disposed segments.

3. A furnace in accordance with claim 1 wherein quartz tube conduit is formed of a substantially radiation-transparent quartz.

4. A furnace in accordance with claim 3 wherein the radiation-transparent quartz tube houses a radiation-absorbing structure.

5. A furnace in accordance with claim 4 wherein the radiation-absorbing structure comprises open packings formed of a material selected from a groups consisting of silica, alumina, zirconia, carbon, silicon carbide, alumina-silicate, clay, ceramic, refractory metal oxides, carbides, aluminates and silicates.

6. A furnace in accordance with claim 1 wherein the supporting means comprises a movable cart adapted for movement into and out of the furnace, wherein means are provided for cooling the movable supporting cart structure to minimize thermal expansion.

7. In a furnace for the heating of gases, the improvement comprising:

A fused quartz tube conduit structure having one or more vertically disposed segments with the quartz tube conduit being formed of a substantially radiation-transparent quartz, which radiation-transparent quartz tube houses a radiation-absorbing structure, said radiation-absorbing structure comprising open packing housed within an annular heating zone having as its outer wall the radiation-transparent quartz tube; and means for supporting the lower ends of the vertically disposed segments, said supporting means having underlying surfaces carrying all of the weight of the segments.

8. In a furnace for the heating of gases, the improvement comprising:

a fused quartz tube conduit structure having one or more vertically disposed segments;

means for supporting the lower ends of the vertically disposed segments, said supporting means having underlying surfaces carrying substantially all of the weight of the segments; and means for stabilizing the quartz tube conduit structure within the furnace in an upright position.

9. In a furnace for the heating of gases, the improvement comprising:

a fused quartz tube conduit structure having one or more vertically disposed segments, said fused quartz tube conduit segments having concentrically disposed outer and inner fused quartz tubes defining an annular gas passageway; and means for supporting the lower ends of the vertically disposed segments, said supporting means having underlying surfaces carrying substantially all of the weight of the segments.

10. A furnace in accordance with claim 9 wherein the outer tube is formed of a substantially radiation-absorbing fused quartz.

11. A furnace in accordance with claim 9 wherein the outer tube is formed of substantially radiation-transparent fused quartz.

12. In a furnace for the heating of gases, the improvement comprising:

a fused quartz tube conduit structure having one or more vertically disposed segments; and means for supporting the lower ends of the vertically disposed segments, said supporting means having underlying surfaces carrying substantially all of the weight of the segments and comprising a movable cart adapted for movement into and out of the furnace.